July 9, 1940.  A. M. STONER  2,207,525
CHUCK
Filed May 12, 1939
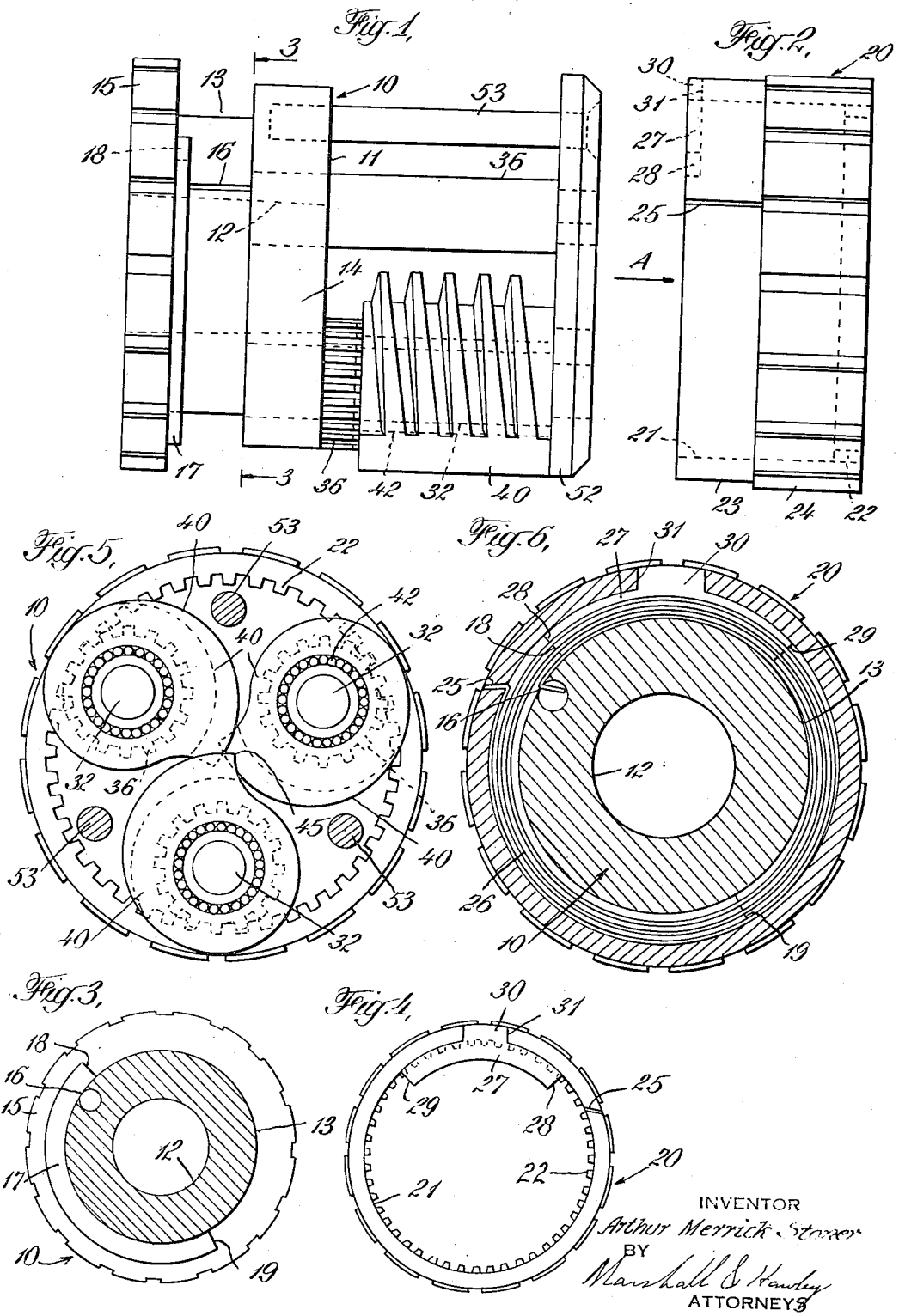
INVENTOR
Arthur Merrick Stoner
BY
Marshall & Hawley
ATTORNEYS Patented July 9, 1940

2,207,525

UNITED STATES PATENT OFFICE 2,207,525

CHUCK

Arthur Merrick Stoner, West Hartford, Conn., assignor to The Jacobs Manufacturing Company, Hartford, Conn., a corporation of Connecticut Application May 12, 1939, Serial No. 273,159

1 Claim. (Cl. 279—33)

This invention relates to improvements in chucks, of the type shown in my co-pending application Serial No. 218,111, filed July 8, 1938.

Its object is to improve the construction of such chucks for the purpose of making them shorter and stronger and of simplifying their design and facilitating the assembly of their parts.

More specifically, the object is to provide a novel and effective arrangement for limiting the relative movements of the parts of the chuck, which is simple and inexpensive and occupies but little space.

These and other objects of the invention will appear from the following specification in which I will describe the invention, the novel features of which will be pointed out in appended claim.

Referring to the drawing:

Fig. 1 is a side elevation of the body of the chuck, together with some of the parts which are supported by it;

Fig. 2 is a side elevation of a sleeve which fits over and is rotatively supported on the body;

Fig. 3 is a sectional end elevation of the body, the section being taken on the line 3—3 of Fig. 1;

Fig. 4 is an end elevation of the sleeve taken in the direction of the arrow A in Fig. 2 and showing one of the stop pieces;

Fig. 5 is a front elevation of the chuck with its clamping plate removed; and

Fig. 6 is a sectional end elevation of the chuck taken on the line 3—3 of Fig. 1, but with the sleeve of Figs. 2 and 4 on the body of Fig. 1 and with an interconnecting spring added.

10 designates the cylindrical body of the chuck having a transverse face 11 and a tapered opening 12 adapted to fit the arbor of a machine tool, such as a lathe or power drill. 13 is an annular groove near the rear end of the body. The portion 14 of the body in front of the groove is of the same diameter as the inner diameter of the sleeve 20. The portion 15 of the body back of the groove 13 is of slightly greater diameter than that of the portion 14 and its outer surface is knurled to facilitate the operation of the chuck. A longitudinal slot 16 is cut in the bottom of the groove 13 for the reception of an end of a flat spiral spring 26.

The sleeve 20 has an inner cylindrical surface 21 which fits the portion 14 of the body. At its forward end is an internally toothed flange 22 which overlaps the outer face 11 of the body. The rear end of the sleeve abuts against the forward face of the portion 15 of the body. The portion 23 of the sleeve which overlies the slot 13 is of slightly less external diameter than that of its forward portion 24. The latter is of the same diameter as that of the portion 15 of the body and like the latter, its outer surface is knurled to facilitate operation. A longitudinal slot 25 is cut through and across the portion 23 to receive the other end of the flat spiral spring 26 (Fig. 6).

When the parts are assembled as shown in Fig. 6, the spring has a tendency to rotate the sleeve on the body in an anti-clockwise direction, as viewed from the front of the chuck.

The relative movement between the sleeve and the body is limited by the novel arrangement which I will now describe. 17 is an arcuate flat piece of stamped metal affixed to the body 10, preferably by welding. The inner radius of this piece corresponds with that of the bottom of the slot 13. Its outer radius is the same as that of the portion 14 of the body so that the inner end of the sleeve 20 rides on it. The ends 18 and 19 of this stop piece 17 are radially disposed.

27 is another stop piece having the same inner and outer radii as those of the stop piece 17 and having radially disposed ends 28 and 29. An ear 30 intermediate the ends 28 and 29 projects outwardly a distance corresponding to the diameter of the part 23 of the sleeve into a shallow groove or indentation 31 cut into the rear end of the sleeve.

The relative rotation between the sleeve and the body, imparted by the spring 26, is limited by the engagement of the ends 18 and 28 of the stop pieces 17 and 18. The relative rotation between the sleeve and the body in the other direction is limited by the engagement of the ends 19 and 29.

I will describe briefly the other parts of the chuck which are shown in more detail and specifically described in my application Serial No. 218,111, to which reference has been made.

Three posts 32 which are equally spaced angularly and are at an equal distance from the axis of the body 10 project longitudinally from the face 11 of the body. On these posts are rotatively supported pinions 36 which engage the toothed flange 22 of the sleeve. Eccentric clamping jaws 40 are mounted on these posts with interposed rollers 42. There is a non-rotative connection between each clamping jaw and its adjacent pinion. The clamping jaws are provided with overlapping ribs terminating in sharp edges 45 which are brought together to a common axis, as shown in Fig. 5, when the ends 18 and 28 of the stop pieces are in abutment.

52 is a clamping plate on the ends of posts 32 secured in place by screws 53 which extend into the body 10. The clamping plate retains the pinions 36 and the clamping jaws 40 on the posts 32.

The clamping jaws can be opened for the reception of a tool by rotating the sleeve on the body against the action of the spring 26. The fully opened position of the clamping jaws is limited by the abutment of the ends 19 and 29 of the stop pieces.

The chuck may be easily operated when in rotation. A slight pressure of the hand on the sleeve 20 is sufficient to move the jaws toward their open position. After a tool is inserted the hand pressure is released and the spring 26 moves the jaws inwardly. The grip on the tool is instantaneous and self-tightening. If this release of the tool while the chuck is rotating is not desired, the spring may be omitted.

The structure herein shown and described is shorter and lighter than former constructions, is simple to make and to assemble and is very rugged.

What I claim is:

In the type of chuck which comprises a cylindrical body, a sleeve having a cylindrical inner surface rotatively mounted on the body and tool gripping means actuated by the movement of the sleeve on the body, an annular groove in the body having flat transverse walls and being covered by the sleeve, a thin flat arcuate stop piece permanently affixed to one of said walls, a second thin flat stop piece lying on the wall to which the first stop piece is affixed, said second stop piece having an inner arcuate edge abutting the base of the groove, an outer arcuate wall abutting the inner surface of the sleeve and an integral ear extending from said outer edge into an indentation cut into the rear end of the sleeve and a spring between the stop pieces and the wall of the groove opposite the wall to which the first stop piece is affixed, with its ends connected respectively with the body and the sleeve.

ARTHUR MERRICK STONER.